Jan. 9, 1951    P. J. ERNISSE    2,537,883
READILY LOADABLE ROLL FILM CAMERA
Filed Feb. 5, 1948

PAUL J. ERNISSE
INVENTOR
BY
ATTORNEYS

Patented Jan. 9, 1951

2,537,883

UNITED STATES PATENT OFFICE 2,537,883

READILY LOADABLE ROLL FILM CAMERA

Paul J. Ernisse, Rochester, N. Y., assignor to Eastman Kodak Company, Rochester, N. Y., a corporation of New Jersey Application February 5, 1948, Serial No. 6,491

6 Claims. (Cl. 95—31)

This invention relates to roll-film cameras and particularly to a camera including a mechanism into which film can be rapidly loaded and unloaded. One object of my invention is to simplify the loading operations of a roll-film camera. Another object of my invention is to provide a mechanism of the type described in which the film spool is accurately positioned in the camera with the axis in the proper relation to the camera exposure frame. A still further object of my invention is to provide a camera in which the film is supplied to, and removed from, the same spool chamber in the camera, and other objects will appear from the following specification, the novel features being particularly pointed out in the claims at the end thereof.

In application Ser. No. 722,712 for Film Threading and Releasing Device for Cameras, filed January 17, 1947, in my name and in the name of R. W. Wallace, there is shown certain features relating to the rapid loading and unloading of a roll-film camera. The present camera mechanism may be considered an improvement over the device shown in this application.

Coming now to the drawings wherein like reference characters denote like parts throughout:

Figure 1:
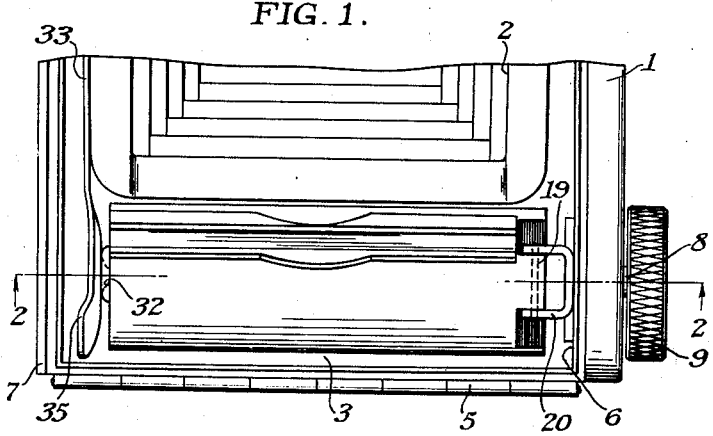
Fig. 1 is a fragmentary view of a camera with the back removed showing a supply film chamber in elevation.

My invention comprises broadly providing a tubular receptacle having an open end which is hingedly attached to the camera body and movable between an operative or film-winding position and an inoperative or film-loading position. In the film-loading position the open end of the tubular receptacle is spaced from the camera into a convenient position for inserting a film cartridge which may be inserted axially of the tubular member after which the tubular member may be rapidly swung down and latched in its operative position.

More specifically, my camera may consist of a camera body designated generally as 1 having an exposure frame 2 over which the film is drawn for exposure and having a supply film chamber 3 at one end and a similar shaped take-up chamber at the other end of the exposure frame, not shown. There may be a camera back 4 hingedly attached to the body 1 by means of a hinge 5 so that this camera back may swing to and from a position in which the supply film spool chamber 3 and the exposure frame 2 are exposed for loading.

Figure 2:
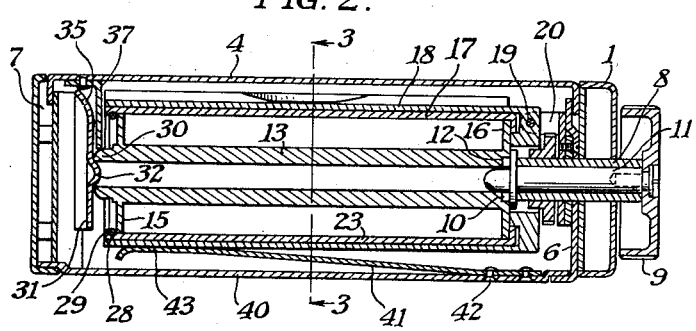
Fig. 2 is a section taken on line 2—2 of Fig. 1.
Figure 3:
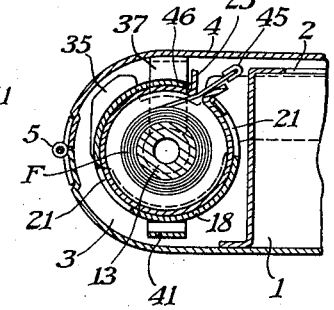
Fig. 3 is a section taken on line 3—3 of Fig. 2.

As indicated in Fig. 1, the supply film spool chamber 3 has oppositely disposed end walls 6 and 7. End wall 6 carries a winding key mechanism 8 having a winding knob 9 and including, as indicated in Fig. 2, a winding key web 10 on the inner end of the mechanism shaft 11. This web is adapted to engage a more or less complemental shaped groove 12 in the hub 13 of a film spool having flanges 15 and, in this case, encased in a generally tubular sheath 17.

Figure 4:
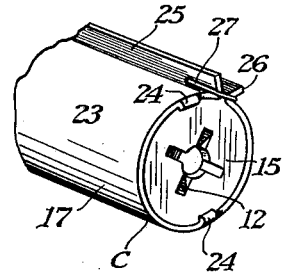
Fig. 4 is a fragmentary perspective view of one end of a preferred type of film cartridge which may be used in the invention to be hereinafter described.

The camera loading mechanism includes a tubular receptacle 18 hingedly attached at 19 to a bracket 20 carried by the end wall 6 of the supply chamber 3. The hinge is arranged so that the axis of the tubular member 23 is coaxial with the axis of the film-winding mechanism 8. The tubular member 18 includes one or more longitudinally extending slots 21 which may extend axially of the tubular container 18 and the container is open at the end 22 for the free insertion and removal of a film cartridge designated broadly as C. This cartridge may include the film spool having the flanges 15 and 16, the hub 13, and the usual convolutions of film F wound on the spool. As indicated in Fig. 4, the generally tubular sheath 23 may have end lugs 24 on one end to prevent the spool flange 15 from sliding beyond the end of the sheath. It may also be provided with outwardly flared lips 25 and 26 and, if desired, a U-shaped spring wire 27 may be placed over the ends of the lips to hold these together. At the opposite end of the film cartridge the sheath 23 is provided with a groove 28 in which a retainer wire ring 29 is snapped so that the film spool will always remain in the proper position in its sheath. One end of the spool hub 30 has a rounded recess; this surface forming a snap-latch element, the other element of which is a rounded protuberance 32 carried on the spring arm 35.

The reason for this construction is that it is necessary that the spool axis should be accurately aligned with respect to the exposure frame. When the film cartridge C has been inserted in the open end 22 of the tubular container 18 and has been moved into the film chamber 3, the snap-latch elements 30 and 32 are engaged, thus holding the spool accurately in alignment and, in addition, forming a snap-latch element. This snap-latch element may be released through a handle 35 which projects from the plate 33; this plate, as shown in Fig. 1, being carried a distance alongside of the central camera body before it is fastened to the camera body as by rivets to provide a springy latch element and spool-centering member.

The camera back 4 may include a downwardly extending arm 37 which may engage the protruding hub member 31 so that when the camera back 4 is swung from an open to a closed position this arm may engage the hub and may move the entire film cartridge C, together with the tubular container 18, downwardly until it is latched in position through engagement of the snap-latch elements 30 and 32. This prevents an operator from accidentally failing to latch the cylindrical container 18 in position before closing the camera back.

On the lower wall 40 of the supply chamber 3 a spring 41 may be mounted, this spring being riveted at one end 42 to the chamber wall and having the opposite end 43 bearing outwardly upon the lower side of the tubular container. Thus, when the camera back is opened, as soon as the handle 35 is moved in the direction shown by the arrow in Fig. 5, the cylindrical container 18 and the film cartridge will be moved outwardly with respect to the film spool chamber and to a readily accessible position.

Figure 5:
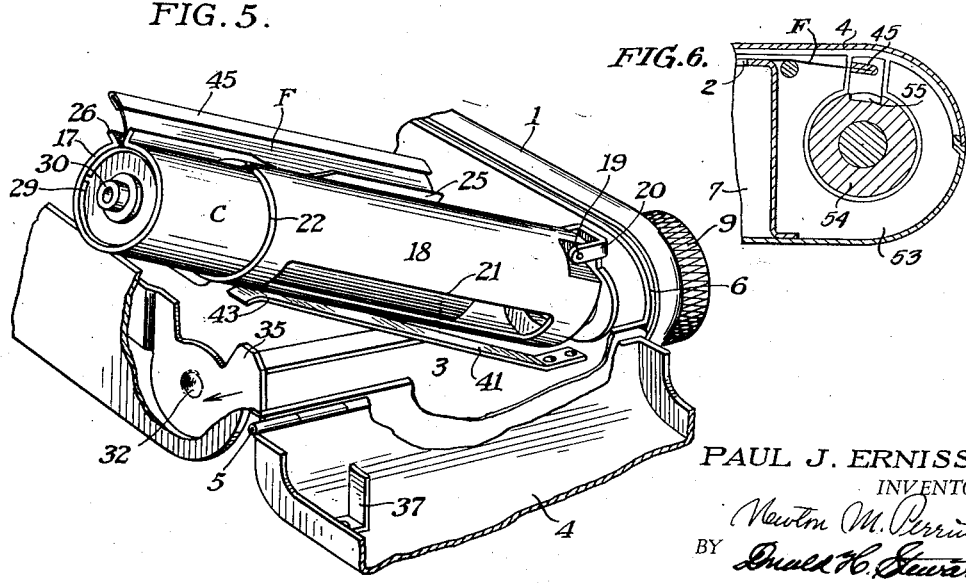
Fig. 5 is a fragmentary perspective view, parts being shown broken away illustrating my improved tubular film receptacle swung partially from its operative, or film-winding, position toward its inoperative, or film-loading, position.

Usually, it is more convenient to swing the tubular container 18 more nearly toward a right-angle position with respect to the exposure frame 2 than is shown in Fig. 5, although even in this position the container is readily accessible.

Figure 6:
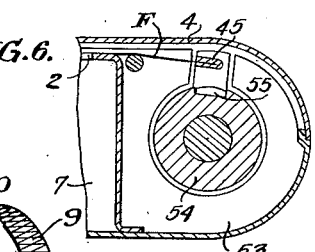
Fig. 6 is a fragmentary sectional view through the opposite end of the camera from that shown in Fig. 3 showing the temporary take-up roll.

The film cartridge C includes film F wound on the spool and this film may be provided with a metallic or otherwise stiffened edge 45, as shown in Fig. 5. If a film is to be exposed, the cartridge with the reinforced end 45 projecting from the diverging lips 25 and 26 of the sheath is moved or loaded into the cylindrical container 18 by passing the lips 25 and 26 into the slot 46 which extends from the open end 22 of the cylindrical container to the hinge. The cartridge C is merely moved axially into the container 18 and the cylindrical container is pressed downwardly and latched by the elements 30 and 32 in its operative or film-winding position. The operator then draws out on the reinforced edge 45 of the film F pulling out a length of film across the exposure frame 2 and snapping it into engagement with a take-up reel which may be the same as that shown in the copending application above referred to. As shown in Fig. 6, the take-up reel may consist of a hub 54 rotatably mounted in the take-up chamber 53. A slot 55 forms a recess into which the reinforcing edge 45 of the film F may be temporarily held in accordance with our copending application above referred to. However, this part of the camera—the temporary film support in the opposite spool chamber from the supply chamber—forms no part of the present invention and will not be further described other than to point out that after the film has been wound and exposed, it is returned by means of the winding knob 9 into its original cartridge C. It is then only necessary to open the back, move the handle 35, so that the spring 43 may thrust the cylindrical container 18 outwardly and remove the cartridge by grasping the cartridge through the slots 21 and sliding it axially. This operation can be very rapidly and easily carried out and there is no chance of an operator improperly locating the spool with respect to the exposure frame so that this type of supply film-receiving mechanism greatly facilitates the film-loading operation.

If the operator does not manually depress the cylindrical container 18 downwardly against the pressure of spring 41, merely closing the cover 4 will move the container 18 downwardly until the snap-latch elements 30 and 32 engage, which occurs when the cover closes on the camera body 1.

I claim:

1. A film receptacle for roll-holding cameras of the type including a casing, end walls, and a wall connecting the end walls, an exposure frame inside the camera walls, and a film chamber extending across one end of the exposure frame and formed of a part of the camera end walls and the wall connecting the end walls, a cover for enclosing the spool chamber and exposure frame, said film receptacle comprising a tubular member hingedly attached to one end wall of the camera and having an open end at the end opposite the hinge and normally lying adjacent the other end wall of the camera, said cylindrical member including spaced edges facing the exposure frame and forming a slot lengthwise of the cylindrical member for the passage of film movable across the exposure frame.

2. A film receptacle for roll-holding cameras of the type including a casing, end walls, and a wall connecting the end walls, an exposure frame inside the camera walls, and a film chamber extending across one end of the exposure frame and formed of a part of the camera end walls and the wall connecting the end walls, a cover for enclosing the spool chamber and exposure frame, said film receptacle comprising a tubular member hingedly attached to one end wall of the camera and having an open end at the end opposite the hinge and normally lying adjacent the other end wall of the camera, said cylindrical member including spaced edges facing the exposure frame and forming a slot lengthwise of the cylindrical member for the passage of film movable across the exposure frame, a spring tending to turn the tubular member about its hinge to thrust the open end of said member outwardly, and a spring latch for holding the tubular member in the film chamber against spring pressure.

3. A film receptacle for cameras of the type defined in claim 1 characterized in that a film-winding key is mounted on an end camera wall to which the cylindrical member is hinged, and an aperture in the tubular member at the hinged end for telescoping the winding key when the hinged tubular member is swung about its hinge into the film chamber.

4. A film receptacle for cameras of the type defined in claim 1 characterized in that a film-winding key is mounted on an end camera wall to which the cylindrical member is hinged, and an aperture in the tubular member at the hinged end for telescoping the winding key when the hinged tubular member is swung about its hinge into the film chamber, and a snap latch for retaining the tubular member in the film spool chamber with the winding key projecting through the aperture in the hinged end.

5. A film receptacle for cameras of the type defined in claim 1 characterized in that a film-winding key is mounted on an end camera wall to which the cylindrical member is hinged, and an aperture in the tubular member at the hinged end for telescoping the winding key when the hinged tubular member is swung about its hinge into the film chamber, said tubular member when turned about its hinge lying in the path of said camera cover movable to enclose the film chamber and the tubular member to be moved thereby into the chamber when said camera cover is swung down over the film chamber.

6. The film receptacle for cameras of the type described in claim 1 characterized in that the tubular receptacle is also provided with a slot spaced from the slot through which film passes which may serve as a finger opening to facilitate the removal of a film cartridge to be removed from the receptacle.

PAUL J. ERNISSE.

REFERENCES CITED

The following references are of record in the file of this patent:

UNITED STATES PATENTS

| Number | Name | Date |
| --- | --- | --- |
| 910,832 | Lukacsevics | Jan. 26, 1909 |
| 1,402,167 | Kingsbury | Jan. 3, 1922 |
| 1,504,977 | Robertson et al. | Aug. 12, 1924 |
| 1,558,100 | Lessler | Oct. 20, 1925 |
| 1,947,483 | Mihalyi | Feb. 20, 1934 |

FOREIGN PATENTS

| Number | Country | Date |
| --- | --- | --- |
| 447,901 | Great Britain | May 19, 1936 |